United States Patent [19]

Hartman et al.

[11] Patent Number: 5,361,317
[45] Date of Patent: Nov. 1, 1994

[54] ASSEMBLY WITH FIXTURE ALIGNING AND AFFIXING AN OPTICAL FIBER TO AN OPTICAL DEVICE

[75] Inventors: Davis H. Hartman, Phoenix; Michael S. Lebby, Apache Junction, both of Ariz.

[73] Assignee: Motorola, Inc., Schaumburg, Ill.

[21] Appl. No.: 75,430

[22] Filed: Jun. 14, 1993

[51] Int. Cl.⁵ .......................... G02B 6/30; G02B 6/12
[52] U.S. Cl. ................................. 385/43; 385/50; 385/88
[58] Field of Search ................. 385/14, 43, 50, 51, 385/88, 89, 90, 92

[56] References Cited

U.S. PATENT DOCUMENTS

| | | | |
|---|---|---|---|
| 4,973,127 | 11/1990 | Cannon, Jr. et al. | 385/98 X |
| 5,011,246 | 4/1991 | Corradetti et al. | 385/92 |
| 5,082,346 | 1/1992 | Myers | 385/65 X |
| 5,109,454 | 4/1992 | Okuno et al. | 385/92 |
| 5,119,451 | 6/1992 | Wills et al. | 385/89 X |
| 5,185,835 | 2/1993 | Vial et al. | 385/51 X |
| 5,259,049 | 11/1993 | Bona et al. | 385/51 X |

*Primary Examiner*—Akm E. Ullah
*Attorney, Agent, or Firm*—Eugene A. Parsons

[57] ABSTRACT

A fixture for aligning and affixing an optical fiber, including a core surrounded by a cladding layer and having an end with a taper, to an optical device, having an active area larger than a cross-section of the core of the optical fiber. The fixture includes a base with a receptacle defined therein. The receptacle extends through the base from a first side to a second side and is substantially larger than a cross-section of the optical fiber at the first side. The receptacle is smaller than a cross-section of the optical fiber and at least as large as the cross-section of the core of the optical fiber at the second side. The base further defines a tapered area in the receptacle with a taper approximately equal to the taper of the end of the optical fiber.

9 Claims, 3 Drawing Sheets

ASSEMBLY WITH FIXTURE ALIGNING AND AFFIXING AN OPTICAL FIBER TO AN OPTICAL DEVICE

FIELD OF THE INVENTION

The present invention pertains to assemblies of optical fibers and optical devices, such as optical detectors and optical light generators, and more specifically to assemblies including a fixture for aligning and affixing an optical fiber to an optical device.

BACKGROUND OF THE INVENTION

Many telecommunications applications of fiber optics require the fixing (or pigtailing) of an optical fiber to the active area of a photodetector or light generating device, such as a laser, or light emitting diode. This fixing process must serve several functions, which functions include: 1) optical alignment of signals carried by the optical fibers to the optical device; 2) permanent physical attachment of the fiber to hold the alignment stable over time, temperature, shock, vibrations and other environmental conditions; 3) strain relief, or protection of the optical fiber, the alignment and the optical device against abusive pulling, torsion, or bending of the connection; and 4) electrical connection and preservation of signal integrity, which means that wire bonding, soldering, or otherwise providing electrical signal contact from the assembly to a host circuit board must be provided. Many applications also require that parasitic capacitance and/or inductance be minimized in the assembly.

The process of aligning and fixing an optical fiber to an optical device, while satisfying all of the above criteria, can be very costly. If the alignment is accomplished by a procedure referred to in the art as "active alignment" (i.e., monitoring of optoelectronically induced signals while aligning) the cost is very high because this procedure is labor intensive. A specific application in telecommunications, namely analog optical receivers used in subcarrier multiplexing applications (such as CATV receivers), has particularly demanding requirements of this fixturing process. In this application, a single single-mode optical fiber with a core diameter of approximately 8 $\mu$m must be aligned to the center of a 60 $\mu$m active area of a photodetector. To maintain photodetector linearity, the center or core of the optical fiber must be aligned within approximately 10 $\mu$m of the center of the photodetector active area, even though the diameter of the photodetector active area is 60 $\mu$m.

Prior devices in this field involve fixturing of the optical fiber in a precision machined ceramic fixture that allows for freedom of movement of the optical fiber relative to the optical device and subsequent fixing by means of an adhesive.

It is a purpose of the present invention to provide a new and improved single optical fiber/device assembly.

It is a further purpose of the present invention to provide a new and improved single optical fiber/device assembly which is relatively simple to fabricate and use.

It is another purpose of the present invention to provide a new and improved single optical fiber/device assembly which reduces labor in assembly and, therefore, results in a product at a substantially reduced price.

SUMMARY OF THE INVENTION

The above described problems and others are at least partially solved and the above described purposes and others are realized by a single optical fiber/device assembly including an optical fiber: with a central core surrounded by a cladding layer and having an end with a predetermined taper, an optical device having an active area larger than a cross-section of the core of the optical fiber and a fixture for connecting and aligning the optical fiber with the optical device. The fixture includes a base having a flat mounting surface, a fiber receptacle defined in the base and extending through the base from a first side to a second side, the receptacle opening at the first side being substantially larger than a cross-section of the optical fiber and the receptacle opening at the second side being smaller than a cross-section of the optical fiber and at least as large as the cross-section of the core of the optical fiber, and the base further defining a tapered area in the receptacle between the openings at the first and second sides of the base with a taper approximately equal to the predetermined taper of the end of the optical fiber. The tapered end of the optical fiber is inserted into the receptacle opening at the first side of the fixture so that the tapered end of the optical fiber is engaged with the tapered area of the receptacle defined in the base. An adhesive filling is placed in the receptacle opening at the first side of the fixture surrounding and affixing the optical fiber in the opening. The optical device is affixed to a surface of the fixture with the active area optically aligned with and overlying the receptacle opening at the second side of the fixture.

BRIEF DESCRIPTION OF THE DRAWINGS

Referring to the drawings wherein like characters indicate like parts throughout the various figures.

DESCRIPTION OF THE PREFERRED EMBODIMENT

Figure 1:
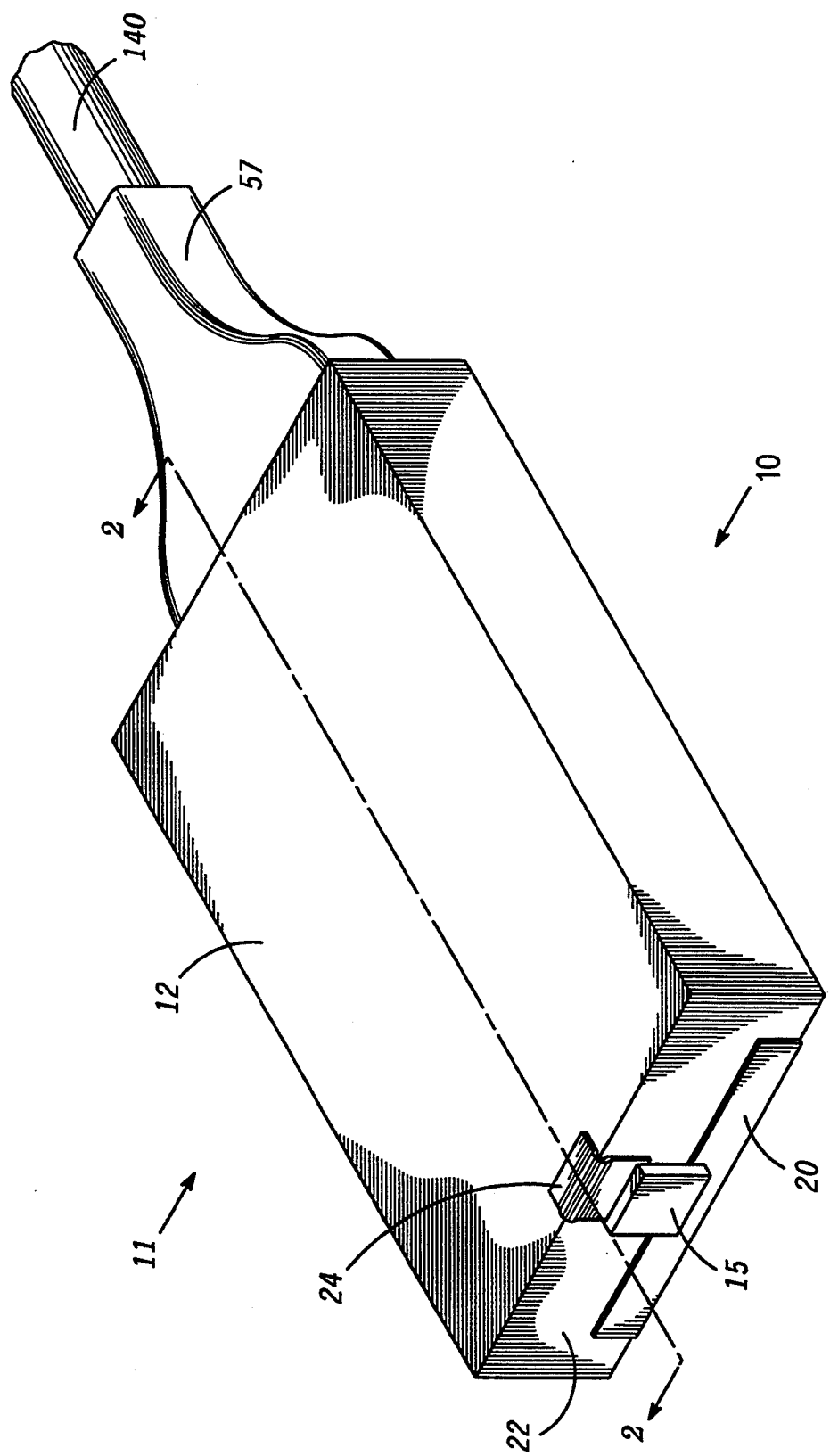
FIG. 1 is a view in perspective of an enlarged single optical fiber/device assembly embodying the present invention.

A single optical fiber/device assembly 10 embodying the present invention is illustrated in an enlarged view in FIG. 1. Assembly 10 includes a fixture 11 with a base 12 molded into a convenient external shape, which in this embodiment is a flat rectangular shape for ease in mounting on a flat surface. Assembly 10 further includes an environmentally protected optical fiber 140 and an optical device 15. Optical device 15 can be a light detector, such as a photodiode, or a light generator, such as a light emitting diode or a vertical cavity surface emitting laser, and optical fiber 14 (illustrated in FIG. 2) can be a single-mode fiber or a multi-mode fiber, depending upon the application. Optical fiber 14 includes a central core 16 and a surrounding cladding layer 17. One end of optical fiber 14, fixed within base 12, is tapered (in accordance with existing art), which taper is typically around a 10° half angle.

Fixture 11 further includes a first electrical contact 20 and a second electrical contact 24 for electrically and physically mounting optical device 15 on base 12. Electrical contact 20 is formed at either or both of a front edge 22 of base 12 or a bottom surface (not shown). Electrical contact 20 can be formed by a number of different possible techniques including screen printing, sputtering, etc. Second electrical contact 24 for affixing optical device 15 is formed on the upper surface of base 12 for convenience in accessing it. Electrical contacts 20 and 24 and connections to optical device 15 are made by any convenient means, such as a leadframe molded into base 12, as described more fully in a copending U.S. patent application entitled "Optical Waveguide With Contacts Utilizing Leadframes", Ser. No. 07/920,073, filed Jul. 27, 1992 U.S. Pat. No. 5,271,083, or flexible leads affixed to the outer surface of base 12, as described more fully in a copending U.S. patent application entitled "Optoelectronic Mount Including Flexible Substrate and Method For Making Same", Ser. No. 07/937,013 U.S. Pat. No. 5,249,245, filed Aug. 31, 1992.

Figure 2:
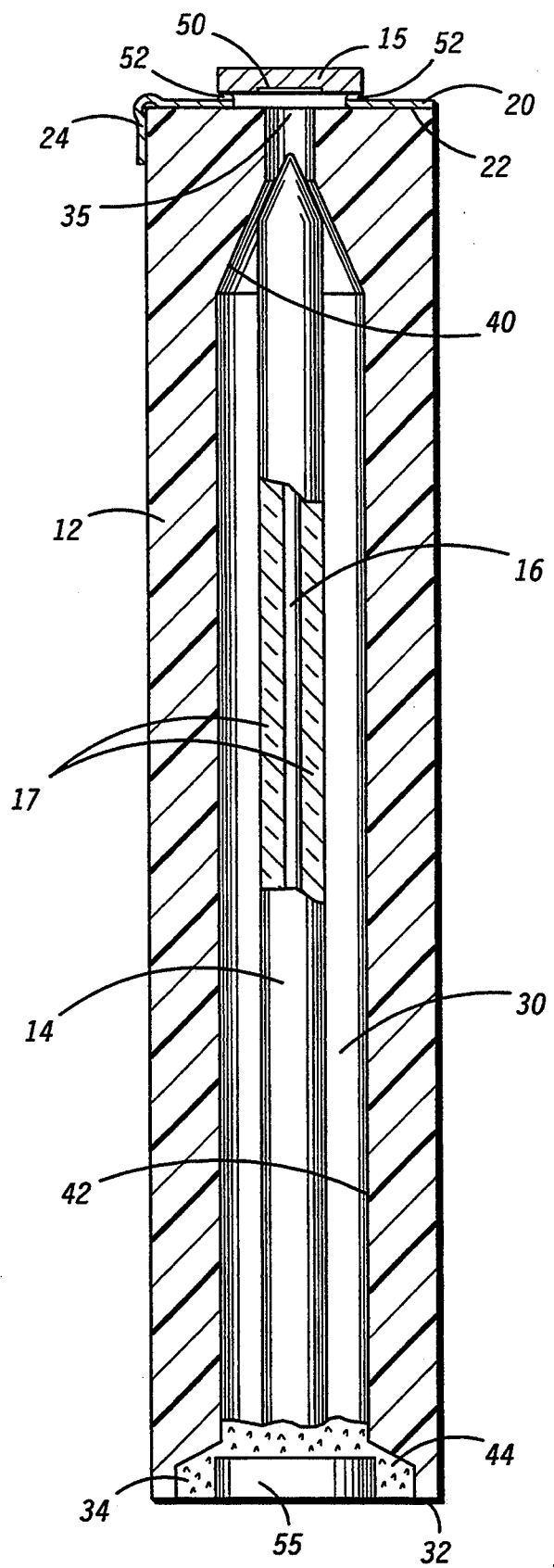
FIG. 2 is a greatly enlarged sectional view as seen from the line 2—2 in FIG. 1, portions thereof broken away.

The internal construction of base 12 is illustrated in FIG. 2, which is a greatly enlarged cross-sectional view as seen from the line 2—2 of FIG. 1. Base 12 is constructed to define an optical fiber receptacle 30 extending therethrough from a first receptacle opening 34 in a side, or edge, 32 to a second receptacle opening 35 in side, or edge, 22. Receptical opening 34 defined in side 32 is substantially larger than a cross-section of optical fiber 14 (several times as large). Receptical opening 35, defined in side 22 is smaller than the cross-section of optical fiber 14 and is at least as large as a cross-section of core 16 of optical fiber 14. Receptical 30 further defines a tapered, or beveled, area 40, which tapers from a larger portion 42 of receptacle 30 to receptacle opening 35. In this specific embodiment, receptacle 30 has a portion 44 adjacent receptacle opening 34 which is tapered outwardly so as to have a diameter even larger than portion 42. Portion 44 further aids in guiding the tapered end of optical fiber 14 toward tapered portion 40 and is utilized in the eventual fixing of optical fiber in base 12, as will be explained presently.

Optical device 15 has an active area 50 which, for photodetectors, is approximately 60 μm in diameter. Receptical opening 35 in side 22 is approximately the same diameter as active area 50. While active area 50, in this embodiment, is illustrated as being larger than core 16 of optical fiber 14, it should be understood that core 16 and active area 50 could be the same size or, in some applications core 16 could be larger than active area 50. It is fully anticipated that fixture 11 will operate equally well in all of these circumstances to optically align core 16 with active area 50.

Electrical contacts 20 and 24 are constructed so that electrical contacts of optical device 15 are electrically and physically connected thereto by some convenient means. In this specific disclosure, optical device 15 is electrically and physically connected to electrical contacts 20 and 24 by bump bonding wherein bumps 52, formed of solder, gold, conductive adhesive, or the like, are utilized. In general, conductive adhesives are preferred because the initial alignment can be maintained as the material hardens. By providing specific contact areas in conjunction with electrical contacts 20 and 24, such as described in more detail in the above cited copending applications, optical device 15 can be placed on side 22 of base 12 using a robotic visual system or the like.

To affix optical fiber 14 in optical communication with optical device 15, the tapered end of optical fiber 14 is inserted into receptacle 30 of base 12 through receptacle opening 34. The tapered end of optical fiber 14 is guided by tapered area 40 in receptacle 30 into axial alignment with receptacle opening 35 and, consequently, active area 50 of optical device 15. Generally, in addition to core 16 and cladding layer 17, most optical fibers include an outer protective coating 55. In this embodiment, protective coating 55 is stripped back so that the end is positioned in the portion 44 of receptacle 30. With optical fiber 14 held firmly in the position illustrated in FIG. 2, an adhesive is introduced into receptacle opening 34 so as to surround protective coating 55 and at least partially fill receptacle 30.

It will of course be understood by those skilled in the art that the particular sequence in which optical device 15 arid optical fiber 14 are affixed to base 12 is not critical and any convenient sequence may be utilized. Also, specific adhesives are not described herein since these are well known in the art and may vary in accordance with different applications. Further, at some convenient point in the assembly a flexible plastic or rubber jacket 57 (illustrated in FIG. 1) is fixedly positioned at receptacle opening 34 so as to surround and protect optical fiber 14. Generally, jacket 57 is fixedly attached to base 12 around receptacle opening 34 and in surrounding engagement with optical fiber 14, so that any forces which might inadvertently be applied to optical fiber 14 are absorbed by jacket 57. Jacket 57 provides strain relief for optical fiber 14 against abusive pulling, torsion or bending of optical fiber 14 near base 12.

Figure 3:
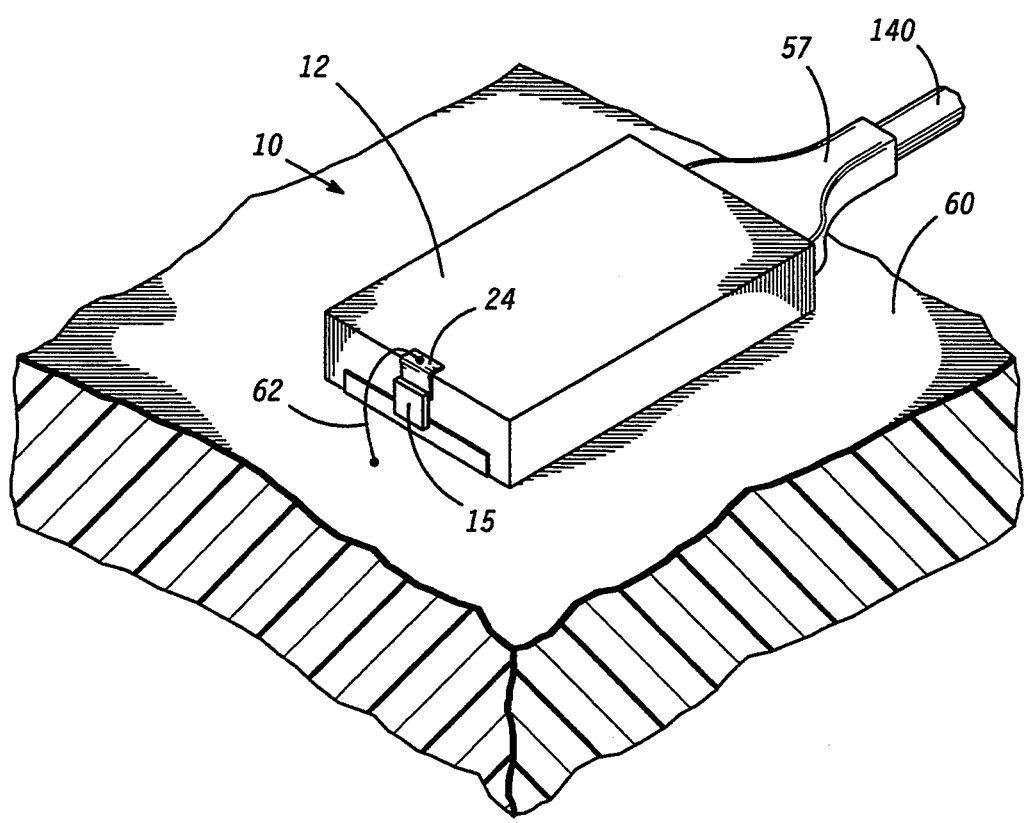
FIG. 3 is an enlarged view in perspective of the assembly of FIG. 1 attached to a printed circuit board.

Referring specifically to FIG. 3, assembly 10 is illustrated bonded to a printed circuit board 60. From this view, the advantages of the specific configuration of base 12 can be seen. The flat surface of base 12 provides a convenient means for easily mounting the assembly on the surface of printed circuit board 60, using an adhesive, soldering of electrical contact 20, or any other convenient structure. Further, while contact 20 is simply soldered to a contact on printed circuit board 60, electrical contact 24 can be easily connected to printed circuit board 60 by, for example, wire bond 62.

While fixture 11, as described, is utilized to align and optically connect a single optical fiber to a single optical device, it will be understood that more than one receptacle can be incorporated into a single base so that several optical fibers/devices can be connected, in specific applications. Thus, an optical fiber/device assembly is disclosed which automatically aligns an optical fiber to the working area of an optical device, permanently affixes the optical fiber/device in alignment and provides strain relief for the optical fiber as well as electrical connections for the optical device. Because the alignment is automatic, the assembly can be chiefly performed by robotics or the like with very little costly human labor involved. Further, the fixture is molded so that it can be made in high volume at very low cost.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A fixture for aligning and affixing an optical fiber, including a central core surrounded by a cladding layer and having an end with a predetermined taper, to an active area of an optical device, the fixture comprising:

a base;

a fiber receptacle defined in the base and extending through the base from a first side to a second side, the receptacle at the first side defining an opening larger than a cross-section of the optical fiber to be affixed and the receptacle at the second side defining an opening smaller than the cross-section of the optical fiber and at least as large as a cross-section of the core of the optical fiber; and the base further defining a tapered area in the receptacle between the receptacle openings at the first and second sides of the base with a taper equal to the predetermined taper of the end of the optical fiber.

2. An assembly with fixture for aligning and affixing an optical fiber to an optical device comprising:

an optical fiber including a central core surrounded by a cladding layer and having an end with a predetermined taper;

an optical device having an active area larger than a cross-section of the core of the optical fiber;

a fixture including a base having a flat mounting surface, a fiber receptacle defined in the base and extending through the base from a first side to a second side, the receptacle at the first side defining an opening larger than a cross-section of the optical fiber and the receptacle at the second side defining an opening smaller than the cross-section of the optical fiber and at least as large as a cross-section of the core of the optical fiber, and the base further defining a tapered area in the receptacle between the openings at the first and second sides of the base with a taper equal to the predetermined taper of the end of the optical fiber;

the tapered end of the optical fiber being inserted into the opening of the receptacle at the first side of the fixture so that the tapered end of the optical fiber is engaged with the tapered area of the receptacle defined in the base; and an adhesive filling in the opening of the receptacle at the first side of the fixture surrounding and affixing the optical fiber in the opening, the optical device being affixed to a surface of the fixture with the active area optically aligned with and overlying the opening of the receptacle at the second side of the fixture.

3. An assembly with fixture for aligning and affixing an optical fiber to an optical device as claimed in claim 2 wherein the base further includes a flat surface for mounting the assembly on a mounting surface.

4. An assembly with fixture for aligning and affixing an optical fiber to an optical device as claimed in claim 3 wherein the base further includes at least one metallized electrical contact on the flat surface.

5. An assembly with fixture for aligning and affixing an optical fiber to an optical device as claimed in claim 4 wherein the base further includes mounting pads positioned at the second surface of the base adjacent the opening of the receptacle.

6. An assembly with fixture for aligning and affixing an optical fiber to an optical device as claimed in claim 5 wherein the optical device is electrically and physically connected to the mounting pads.

7. An assembly with fixture for aligning and affixing an optical fiber to an optical device as claimed in claim 6 wherein the optical device is electrically and physically connected to the mounting pads by bump bonding.

8. An assembly with fixture for aligning and affixing an optical fiber to an optical device as claimed in claim 7 wherein the base further includes electrical leads electrically connecting at least one of the mounting pads to the metallized electrical contact.

9. An assembly with fixture for aligning and affixing an optical fiber to an optical device as claimed in claim 2 further including a flexible strain relief element surrounding a portion of the optical fiber adjacent the opening of the receptacle at the first side of the base, the strain relief element being affixed to an area of the base at the first side of the base and extending externally from the base a predetermined distance.

* * * * *